United States Patent [19]

Mosher

[11] Patent Number: 4,828,054

[45] Date of Patent: May 9, 1989

[54] COMBINATION WEIGHER HAVING A STANDBY PRODUCT CHARGE

[75] Inventor: Oren A. Mosher, Castro Valley, Calif.

[73] Assignee: Package Machinery Company, Stafford Springs, Conn.

[21] Appl. No.: 212,942

[22] Filed: Jun. 29, 1988

[51] Int. Cl.⁴ ..................... G01G 13/00; G01G 19/52
[52] U.S. Cl. .................... 177/25.18; 177/50; 177/58
[58] Field of Search .......... 177/25.18, 50, 58

[56] References Cited

U.S. PATENT DOCUMENTS

| | | | |
|---|---|---|---|
| 4,341,274 | 7/1982 | Hirano et al. | 177/25.18 |
| 4,388,975 | 6/1983 | Hirano | 177/25.18 |
| 4,416,341 | 11/1983 | Hirano | 177/25.18 |
| 4,418,771 | 12/1983 | Henry et al. | 177/25.18 X |
| 4,446,937 | 5/1984 | Asai | 177/25.18 X |
| 4,473,126 | 9/1984 | Hirano | 177/25.18 X |
| 4,515,231 | 5/1985 | Ishida | 177/25.18 |
| 4,522,274 | 6/1985 | Konishi et al. | 177/25.18 |
| 4,549,617 | 10/1985 | Matsumoto et al. | 177/25.18 X |
| 4,569,406 | 2/1986 | Pringle et al. | 177/25.18 |

*Primary Examiner*—George H. Miller, Jr.
*Attorney, Agent, or Firm*—McCormick, Paulding & Huber

[57] ABSTRACT

A novel combination weigher for producing a product charge of precise weight by combining the contents of a plurality of scales each of which contains a portion of the product charge is characterized by an auxiliary or standby weighing scale or hopper which provides a product charge if a controller determines that there is no combination of the scales which will provide a product charge within a specified weight range.

17 Claims, 3 Drawing Sheets

4,828,054

COMBINATION WEIGHER HAVING A STANDBY PRODUCT CHARGE

TECHNICAL FIELD

This invention relates to the field of weighing systems and more particularly to a combination apparatus having an auxiliary hopper apparatus to be used in selected situations.

BACKGROUND OF THE INVENTION

Weighing systems for producing a product charge of precise weight are well known in the art, and include systems that employ one of several combination weighing techniques. In general, these systems obtain a precise weight product charge by combining the contents of a plurality of buckets or hoppers, each of which contains a portion of the product charge. A controller reads the weight of each hopper, searches for the hopper weight combination which most closely approximates the desired weight, and subsequently dumps the contents of the corresponding hoppers.

Known combination weighing devices include the weighing apparatus disclosed in U.S. Pat. No. 4,515,231. That apparatus is characterized by a serial weighing operation in which articles are first provided to a plurality of fill-to-weight cutoff pool hoppers. After the weight of the product charges in the pool hoppers have been determined, the contents thereof are fed to corresponding weighing hoppers. The weight of product in each of the weighing hoppers is then measured and a computer determines that combination of hoppers whose weight sum is equal or closest to a desired product charge weight. The '231 apparatus is most useful in handling light products or products apt to cling together in bunches. However, that apparatus is burdened by two discrete weighing operations. Moreover, the speed of operation of the combination weigher is necessarily limited by the filling speed of the fill-to-weight cutoff pool hoppers.

U.S. Pat. No. 4,418,771 discloses a combination weighing method and apparatus wherein quantities of the product of targeted weight are distributed to a plurality of scales for accurate weighing. The weighed product charge is fed from each of the scales to a plurality of storage cups associated with each of the scales and the product weight associated with each storage cup is registered. Specific combinations of storage cups are tested to determine whether the combined product weights add to make the desired weight within acceptable limits. The method and apparatus is characterized by a controller which will examine only a subset of scales rather than all of them to find a combination which will provide the desired weight product charge. If no combination produces a total product charge within selected weight limits, the controller will broaden the limits and repeat the cycle.

Known combination weighing systems which will generate a product charge from two or more different articles include the weighing system disclosed in U.S. Pat. No. 4,473,126. The weighing system includes a separate conventional combination weigher for each of the different articles which comprise the product charge. U.S. Pat. No. 4,549,617 teaches a combination weighing system having a method of setting a target value (weight or number) for each of the component articles and supplying a plurality of combination weighing machines. For each category of articles and from all combinations of the weighing machines, a controller determines the best combination whose total value (weight or number) is equal to the target value set for that category.

The combination weighing method disclosed in U.S. Pat. No. 4,522,274 obtains a product charge having a mixture of articles of different categories wherein the articles in each category are contained in the mixture at a number ratio approximately equal to a target number. The method includes the steps of setting a number for each category to provide a number ratio closest to a target category number ratio, and measuring the total weight of a primary mixture obtained by extracting the set number of articles in each category and mixing these articles. If the weight of the primary mixture is initially outside of a minimum, a controller computes the weight difference between the primary mixture and target weight and provides supplemental articles to make up the short fall. The method provides for uniformity in the product weight-to-target number ratio as opposed to component distribution.

The combination weighing device taught in U.S. Pat. No. 4,388,975 simultaneously weighs a plurality of articles in weighing balances and selects a plurality of the weighing balances to comprise a total weight of articles within a predetermined range. The device is characterized by a controller which causes one or more of the specified weighing balances to always enter into the selected combination to insure that each package contains articles from selected weighing balances.

One of the problems associated with combination weighing systems is that there is a finite number of times that the scales will not present at least one combination that is within the acceptable weight range for a product charge. When this happens known combination weighers simply output an empty bag or cause a bagging cycle to be skipped entirely. Such an occurrence is known as a "miss".

For high volume application the number of misses can be substantial. For example, for metalized tobacco pouches where a weigher may package approximately twenty million packages per year, there will be approximately three hundred thousand throw away packages because of missed filling cycles.

It would be advantageous to have a combination weigher which provides for a mechanism that will supply a product charge during those times when the combination weigher is unable to come up with a product charge within the acceptable product charge quantity range. The present invention is drawn to such an apparatus.

SUMMARY OF THE INVENTION

An object of the present invention is to provide a simple and inexpensive weighing system that eliminates missed product filling cycles.

According to the present invention a system for preparing a charge of product closely approximating a predetermined target quantity includes a product feed for delivery of individual quantities of product, and a plurality of product scales for receiving and measuring the individual quantities of product delivered by the product feed. The scales each provide signals indicative of the quantity of product therein. A storage mechanism is included for receiving and storing a charge of product closely approximating the target quantity. A discharge mechanism receives product from both the scales and the storage mechanism. The system includes a controller responsive to signals from the plurality of product scales for selecting a combination of scales which yields a charge of product near in quantity to the target quantity, and releasing the charge to the discharge mechanism. The controller is also responsive to the signals from the plurality of product scales and is connected with the storage mechanism for discharging the stored charge of product into the discharge mechanism instead of product in the scales when no combination of product scales yields a product charge within a predetermined range.

DESCRIPTION OF THE PREFERRED EMBODIMENT

Figure 1:
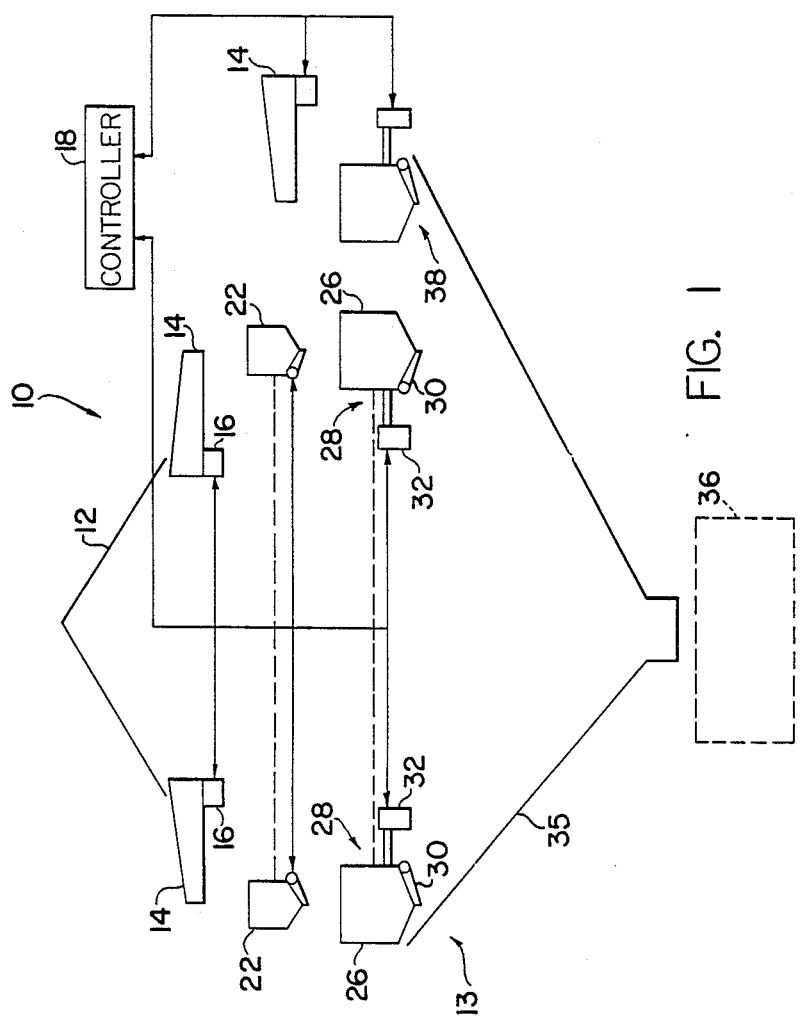
FIG. 1 is a simplified schematic illustration of a combination weigher according to the present invention.

Referring now to FIG. 1, there is illustrated in a simplified schematic format, a weighing system 10 provided according to the present invention. The system 10 is used to package a variety of products and is especially useful with those products requiring an expensive package, such as tobacco in pouches.

The constituent product (tobacco, for example) is received at a distributor 12, typically conical in shape, which is part of a major constituent combination weigher 13 commonly referred to as a "class 0" type weigher. The product is distributed to a plurality of product conveying or feeding devices, such as devices 14 arranged in a circular array at the lower edge of the distributor. The feeding devices include conventional vibrator mechanisms 16. The amount of product provided to each of these devices is sufficient to keep the devices supplied with product at a given level at all times. In a conventional manner, a controller 18 coarsely meters product in the devices 14 to the respective accumulator hoppers 22. On demand, the contents of a given accumulator hopper is dumped into a corresponding bucket 26 or hopper of a weighing scale 28. Each weighing scale weighs the product charge and provides signals indicative thereof to controller 18. Each scale has a door 30 which will open or close by means of an actuator 32 in response to signals received from the controller. As described hereinafter, the weighing system of FIG. 1 algorithmically determines in a known manner a combination of scales whose summed content constitutes the product charge. The product is dumped from the selected weighing scales into a conventional discharge funnel 35 which directs the individual quantities of product from the selected scales to a bagging machine 36 which collects the product and deposits the product charge in a bag or other container. The bagging machine is not part of the present invention.

As noted above, combination weighers are burdened by a finite miss rate where the controller fails to qualify a combination of product in the weigh scales. That is, there will some times be no combination of product weights in the scales which, when deposited in the container, will be at or near the target product charge weight within an accepted product charge weight range. Consequently, no product dump occurs, and the container exits the machine empty. Typical miss rates on known machines are between 0.3 to 1.0% of the machine's operation. A miss rate of this magnitude is unacceptable for products whose container costs approach five to fifteen cents per unit.

To solve the problem, the preferred weighing system detailed in FIG. 1 provides for a standby weigh scale 38 which also receives product from one of the feeding devices 14 and stores the product until needed. Upon detecting a "miss", that is where no combination of weighing scales 28 will together form a product charge in the acceptable weight range, the controller will dump the contents of the standby weigh scale 38 and thereby avoid generating an empty container.

In the embodiment of FIG. 1, the weigh scale 38 comprises a conventional fill-to-cutoff weigh scale. The feeding device 14 associated with the scale 38 provides product to weighing scale 38 in a closed loop manner until the weight of product therein is approximately equal to the target weight.

Figure 2:
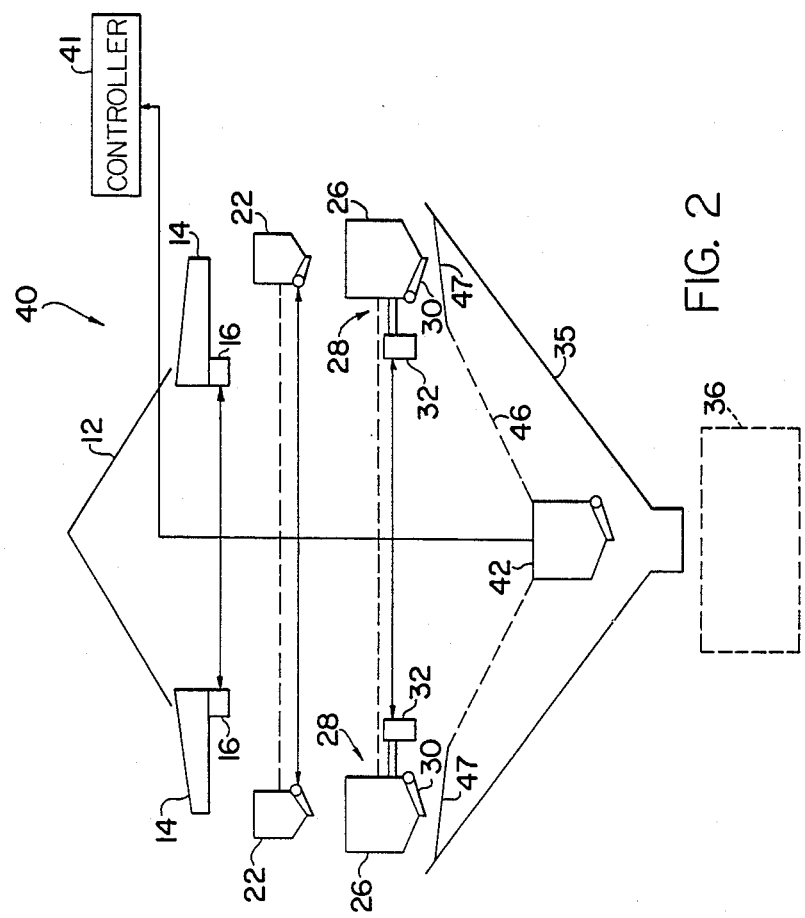
FIG. 2 is a first alternative embodiment of the combination weigher of FIG. 1.

In FIG. 2 there is illustrated a first alternative embodiment 40 of the weighing system of FIG. 1. An auxiliary or standby hopper 42 for storing a standby product charge is positioned in the discharge funnel 35 below the weighing scales 28. A moveable diverter 47 is shown schematically under each associated scale and allows discharge either to the packaging machine 36 or to the standby hopper.

The controller 41 is connected with the diverters 47 and is configured to dump product from a selected combination of weighing scales to the discharge funnel 35 and the packaging machine if the controller, in a first search of the weights of product in the loaded scales, has determined that a product charge can be formed within the acceptable product charge weight range. If the standby hopper 42 is empty at the same time, the controller makes another search of the remaining unselected weighing scales for a second combination of scales which yield a quantity of product within the acceptable product charge weight range, and if found, the second combination of scales is dumped by means of the associated diverters into the empty standby hopper 42. The controller always tries to keep the standby hopper filled.

When a "miss" is detected, the controller will dump the standby hopper 42, which contains a product charge of an acceptable weight. With the addition of other diverters, several standby charges can be stored by several hoppers.

Figure 3:
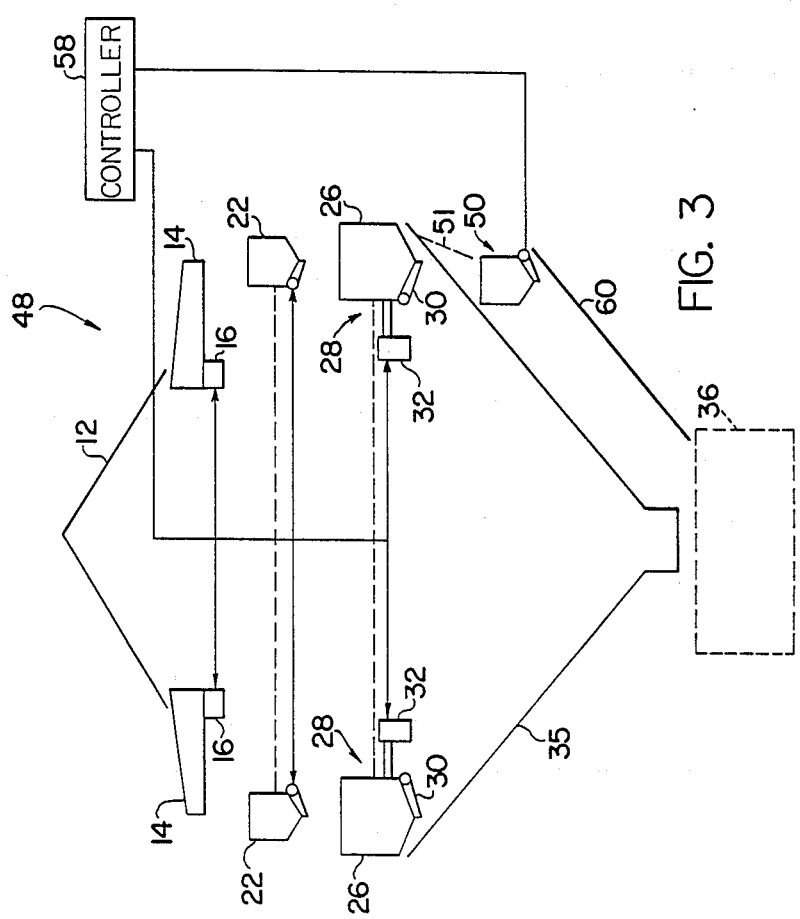
FIG. 3 is a second alternative embodiment of the combination weigher of FIG. 1.

Referring now to FIG. 3 there is illustrated a second alternative embodiment 48 of the weighing system of FIG. 1. A standby hopper 50 for storing a standby product charge is mounted outside of the discharge funnel 35 below an associated weighing scale 28. The hopper 50 can be filled with product from the associated scale by way of a diverter 51 shown schematically as a part of the funnel.

Normally the feeders 14, the accumulators 22 and weighing scales 28 are operated by the controller 58 as a conventional combination weighing machine and deliver product charges directly to the packaging machine by way of the discharge funnel 35. However, when the standby hopper 50 is empty, the controller 58 opens the door on the accumulator 22 associated with the scale and hopper 50 and operates the associated feeder 14 in a fill-to-cutoff mode until the weight in the scale 28 reaches the target weight. Normal combination operations may continue on the remaining scales. Once the target weight is reached, the diverter 51 is moved and product is transferred for storage from the scales to the hopper 50. At this point the feeder 14, accumulator 22 and scale 28 are returned to normal combination operation.

Any time the controller 58 is unable to find an acceptable combination, the stand-by hopper 50 is discharged to the packaging machine through the auxiliary chute 60. This can also be done on cycles where an overweight scale is discharged down chute 35 and out to a product reject bin (not shown). A weigh system of this type can be fitted with one stand-by hopper for each weighing scale.

The present system yields increased productivity because the miss rate is significantly reduced, generally from between 1 and 2 percent to approximately 0.2 percent. One skilled in the art will note that the standby hopper system as described herein can easily be incorporated into a double or multiple discharge weighing system with conventional modifications to existing hardware and software. The present invention is also most useful in packaging those products where weight scanning problems exist, that is, products with which it is difficult to get an acceptable combination of first or primary weighing scales. These products produce higher miss rates with known weighing systems. However, since misses are substantially eliminated with the present weighing system, packaging costs for these type products are dramatically reduced.

Although the invention has been described hereinabove with respect to a product, such as tobacco, which is customarily measured and packaged by weight, those skilled in the art will note that the invention also has utility in packaging other products which are quantified by a different parameter such number or count. Pharmaceutical products, such as tablets, are frequently packaged by product count. By establishing an accurate weight per unit product, the present packaging system can be readily adapted to produce a count with great accuracy.

Although the invention has been shown and described in a preferred embodiment, it should be understood by those skilled in the art that various changes, omissions and additions may be made without departing from the spirit and scope of the invention.

I claim:

1. A system for preparing a charge of products closely approximating a predetermined target quantity within a charge quantity range, comprising:
   a product feed means for delivery of individual quantities of the product;
   a plurality of first product scales for receiving and measuring product from the product feed means and providing signals representing the quantity of product in each scale;
   a second product scale for receiving and measuring product approximately equal in quantity to the target quantity and for generating a signal representing the quantity of product therein;
   a controller responsive to the signals from the plurality of first product scales for selecting a combination of the first product scales which yields a charge of product near in quantity to the target quantity, said controller further connected with the second product scale for selecting said second product scale if said controller determines that no combinations of said first product scales results in a product charge within said charge quantity range.

2. The system of claim 1 wherein said target quantity and said charge quantity range comprise a target weight and charge weight range, respectively.

3. The system of claim 1 wherein said target quantity and charge quantity range comprise a target number and charge number range, respectively.

4. The system of claim 1 wherein said second product scale is configured from one of said first scale plurality.

5. A system for preparing a charge of product closely approximating a predetermined target quantity within a charge quantity range, comprising:
   a product feed means for delivery of individual quantities of the product;
   a plurality of product scales for receiving and measuring the individual quantities of product from the product feed means and providing signals representing the individual quantities in each scale;
   a product hopper for receiving product approximately equal in quantity to the target quantity;
   a controller responsive to the signals from the plurality of product scales for selecting and dumping a combination of the product scales, which combination yields a charge of product near in quantity to the target quantity, said controller further being connected with said hopper for selecting and dumping said hopper if said controller determines that no combination of said product scales results in a product charge within said charge quantity range.

6. The system of claim 5 wherein said controller, after selecting said combination of scales, provides product to said hopper from unselected scales.

7. The system of claim 5 wherein said target quantity and said charge quantity range comprise a target weight and charge weight range, respectively.

8. The system of claim 5 wherein said target quantity and charge quantity range comprise a target number and charge number range, respectively.

9. The system of claim 5 further comprising a diverter means, receiving signals from said controller and positioned with said scale plurality, for selectively providing product from at least one of said scale plurality to said hopper.

10. A system for preparing a charge of product for discharge by means of a chute, said product charge closely approximately a predetermined target quantity within a charge quantity range, said system comprising:
   product feed means for delivery of individual quantities of the product;
   a plurality of product scales for receiving and measuring product from the product feed means and providing signals representing the quantity of product in each scale;
   product hopper for selectively receiving and storing product from said scale plurality;
   a diverter between the plurality of scales and the product hopper; and
   a controller responsive to the signals from the plurality of product scales for selecting a combination of scales which yields a charge of product near in quantity to the target quantity and discharging product from the scales to the chute or to the hopper by way of the diverter for storage, said controller further connected to said hopper for discharging stored product from the hopper if said controller determines that no combination of said product scales results in a product charge within said charge quantity range.

11. The system of claim 10 wherein said controller selects a first combination of product scales resulting in a first product charge within said product charge range for discharging through the chute, and selects a second combination of product scales from the remaining scales resulting in a second product charge within said range for storage in the hopper.

12. The system of claim 10 wherein said target quantity and said charge quantity range comprise a target weight and a charge weight range, respectively.

13. The system of claim 10 wherein said target quantity and charge quantity range comprise a target number and charge number range, respectively.

14. A system for preparing a charge of product closely approximating a predetermined target quantity, comprising:
product feed means for delivery of individual quantities of product;
a plurality of product scales for receiving and measuring the individual quantities of product delivered by the product feed means and providing signals representative of the quantity of product in each scale respectively;
storage means for receiving and storing a charge of product closely approxiating the target quantity;
discharge means for receiving product from both the scales and the storage means; and
controller means responsive to signals from the plurality of product scales for selecting a combination of scales which yields a charge of product near to the target quantity and releasing said charge to the discharge means, the controller also being responsive to the signals from the plurality of product scales and connected with the storage means for discharging the stored charge of product into the discharge means instead of product in the scales when no combination of product scales yields a product charge near to the target quantity.

15. A system for preparing a charge of product as defined in claimed 14 wherein:
diverter means are provided for diverting a product from at least one of the product scales to the storage means; and
the controller is also connected to the diverter means for diverting product from at least one of the scales to the storage means for storage of the charge of product closely approximating the target quantity.

16. A system for preparing a charge of product as defined in claim 15 wherein the diverter means comprises a plurality of diverters, each being associated with a respective one of the product scales for diverting product from the associated scale to the storage means; and
the controller is connected with the plurality of product scales and the diverter means for selecting a first combination of scales to discharge a first charge of product into the discharge means, and for selecting a second combination of scales from the remaining product scales to discharge a second charge of product into the storage means by way of the diverter means.

17. A system for preparing a charge of product as defined in claim 15 wherein:
the controller is also connected to the product feed means and is responsive to the signal from said at least one scale to selectively control the delivery of product to said at least one scale and cause said at least one scale to receive a charge of product near to the target quantity.

* * * * *

UNITED STATES PATENT AND TRADEMARK OFFICE
CERTIFICATE OF CORRECTION

PATENT NO. : 4,828,054
DATED : May 9, 1989
INVENTOR(S) : Oren A. Mosher

It is certified that error appears in the above-identified patent and that said Letters Patent is hereby corrected as shown below:

Column 4

Line 2, delete "0.3" and substitute --0.3%--.

Line 50, after "3" insert --,--.

Column 5

Line 28, delete "type" and substitute --types of--.

Column 6

Line 46, delete "approximately" and substitute --approximating--.

Column 7

Line 25, delete "approxiating" and substitute --approximating--.

Signed and Sealed this

Thirtieth Day of January, 1990

*Attest:*

JEFFREY M. SAMUELS

*Attesting Officer*     *Acting Commissioner of Patents and Trademarks*